D. M. Mefford
Preserving Vegetables &c.
No. 101,373. Patented Mar. 29, 1870.
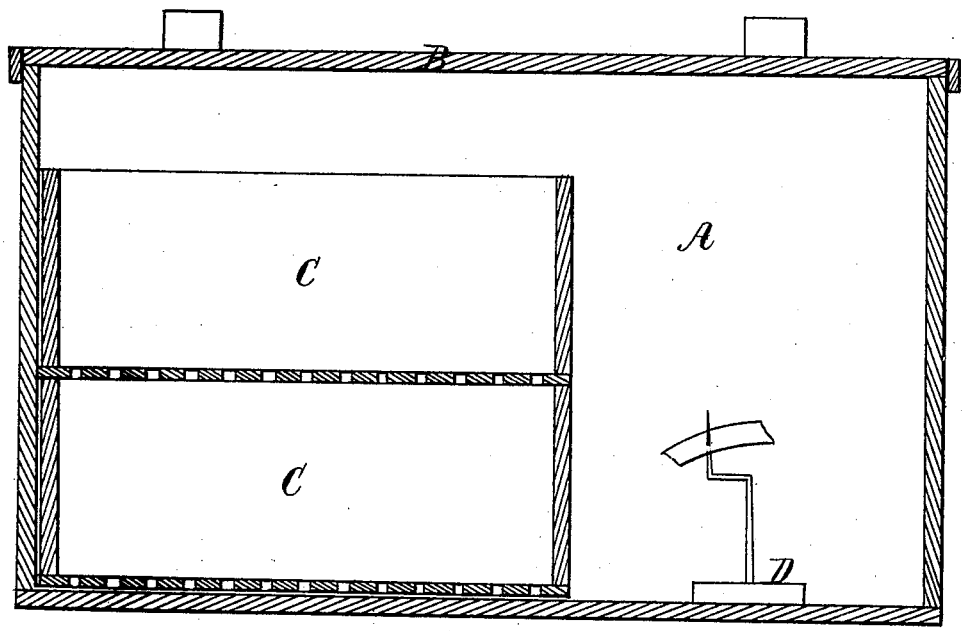
Witnesses;
Susan Peebles
Arabell Peebles
Inventor;
David M. Mefford

UNITED STATES PATENT OFFICE.

DAVID M. MEFFORD, OF NORWALK, OHIO.

IMPROVEMENT IN PRESERVING VEGETABLES, FRUITS, &c.

Specification forming part of Letters Patent No. 101,373, dated March 29, 1870.

*To all whom it may concern:*

Be it known that I, DAVID M. MEFFORD, of Norwalk, in the county of Huron, in the State of Ohio, have invented a new and Improved Mode of Preserving Vegetables, such as green corn, peas, beans, potatoes, cauliflower, and other edibles liable to ferment or putrefy, and which possess no acid sensible to the taste; and I do hereby declare that the following is a full and exact description thereof, reference being had to the accompanying drawings, and to the letters of reference marked thereon.

The nature of my invention consists in the discovery that the antiseptic effect produced by the action of sulphurous-acid gas upon vegetables and other edibles possessing no acid sensible to the taste is not destroyed by neutralizing the acidity imparted by said gas by means of soda or other alkaline substances; and that vegetables and other edibles possessing no native acid of their own sensible to the taste, which have been once treated with sulphurous-acid gas, and the acid taste thus imparted neutralized, need not be heated up to the boiling-point (212° Fahrenheit) to prevent them from fermenting or putrefying, if they are hermetically sealed in air-tight vessels.

To enable others skilled in the art to construct cheap and convenient apparatus and use my invention, I will proceed to describe its construction and operation.

In the accompanying drawing, A is a box cut longitudinally through the center, showing the edge of the lid B, crates C C, and sulphur-burner D with its crooked iron, upon which is transfixed a strip of cotton cloth saturated with sulphur. The box A should be as tight as can be conveniently made out of wood, especially at the bottom. The crates C C are mere conveniences for holding the vegetables or other edibles in thin layers or strata, so that they may be readily acted upon by the sulphurous-acid gas. The lid B should be fitted as closely as will work easily in taking it off or putting it on. There is no necessity, however, of its fitting air-tight, for as the gas is heavier than atmospheric air it is not liable to escape at the top of the box around the edges of the lid. This form of box or case for treating vegetables and other edibles with sulphuric-acid gas admits of various modifications, for any box or barrel that is tight enough to confine the gas until the vegetables or other edibles have time to absorb a sufficient quantity of it to impart a slight acid taste to them may be successfully used.

In treating vegetables or other edibles possessing no acids of their own sensible to the taste with sulphurous acid gas, I first remove the lid B and take out and fill the crates C C with whatever I desire to treat with the gas. I then replace them one upon the top of the other, and affixing a sulphur match upon the crooked iron of the burner D ignite it and replace the lid B.

The vegetables or other edibles under treatment in the box should remain under the action of the gas until they absorb a sufficient quantity thereof to give them a slight acid taste. They are then taken out and placed in vessels, and water or other liquid in which it is intended to preserve them, and which has been boiled, and to which has been added a sufficient quantity of soda or other alkaline substance to neutralize the acid which has been imparted to them, poured over them. The vessels should then be hermetically sealed.

Vegetables and other edibles having been thus treated can be soldered up in tin without danger of corroding the cans.

What I claim as my invention, and desire to secure by Letters Patent, is—

The treating of vegetables and other edibles having no acid sensible to the taste with sulphuric-acid gas until a slight acidity is imparted thereto, and neutralizing the same by means of soda or other alkaline substance, and then hermetically sealing them in air-tight vessels.

DAVID M. MEFFORD.

Witnesses:
SUSAN PEEBLES,
ARABELLA PEEBLES.